United States Patent [19]
Yun

[11] Patent Number: 6,001,043
[45] Date of Patent: Dec. 14, 1999

[54] DRIVE MECHANISM FOR FOUR WHEEL DRIVE AUTOMOBILES

[75] Inventor: Hweu Deok Yun, Kyungki-do, Rep. of Korea

[73] Assignee: Hyundai Motor Company, Seoul, Rep. of Korea

[21] Appl. No.: 08/998,584

[22] Filed: Dec. 29, 1997

[51] Int. Cl.[6] .................................................. F16H 48/06
[52] U.S. Cl. .......................... 475/221; 475/204; 475/206; 180/248
[58] Field of Search ..................................... 475/221, 204, 475/205, 206; 192/58.2, 58.4, 58.41; 180/247–249

[56] References Cited

U.S. PATENT DOCUMENTS

| | | | |
|---|---|---|---|
| 4,601,359 | 7/1986 | Weismann et al. | 475/221 X |
| 4,756,209 | 7/1988 | Hamada et al. | 475/221 X |
| 4,784,236 | 11/1988 | Bauxch et al. | 475/221 X |
| 4,817,753 | 4/1989 | Hiketa | 180/249 |
| 5,041,068 | 8/1991 | Kobayashi | 475/221 |
| 5,083,635 | 1/1992 | Tashiro | 180/248 |
| 5,098,351 | 3/1992 | Kobayashi | 475/221 X |
| 5,167,293 | 12/1992 | Park et al. | 475/221 X |
| 5,197,565 | 3/1993 | Sado | 475/225 X |

*Primary Examiner*—Khoi Q. Ta
*Attorney, Agent, or Firm*—Christie, Parker & Hale, LLP

[57] ABSTRACT

A drive mechanism for 4WD automobiles is disclosed. In the drive mechanism, the center differential (C/D) unit, used for distributing the drive power of an engine to front and rear wheels, is an epicyclic gear train. The C/D unit is operated by a differential drive (D/D) gear. The front differential (F/D) unit, used for transmitting the drive power from the C/D unit to the front wheels, is a bevel gear train. The viscous coupling is connected to the C/D unit, thus limiting the differential operation of the C/D unit. The middle shaft is positioned at a side of the transmission and is rotated by the C/D unit. The middle shaft has a spiral bevel gear for transmitting the drive power to the rear wheels. Due to such a middle shaft, the transfer case is easily installed without causing any interference between the transfer case and the cylinder block of an engine.

1 Claim, 6 Drawing Sheets

DRIVE MECHANISM FOR FOUR WHEEL DRIVE AUTOMOBILES

BACKGROUND OF THE INVENTION

1. Field of the Invention

The present invention relates, in general, to a drive mechanism for FF-4WD (Front Engine, Front Drive & 4 Wheel Drive) automobiles and, more particularly, to a drive mechanism with a middle shaft being positioned at a side of the transmission, thus allowing a transfer case to be easily installed in an engine compartment without causing any interference between the transfer case and the cylinder block of an engine.

2. Description of the Prior Art

As well known to those skilled in the art, a typical drive mechanism for 4WD-type automobiles comprises a transmission (T/M) gear 1, a ring gear 2, a center differential (C/D) unit 4 and a front differential (F/D) unit 5. The T/M gear 1 transmits the rotating force of a transmission (T/M) B to a transfer case (T/F) C as shown in FIGS. 3, 4a and 4b. The ring gear 2 is rotated by the T/M gear 1 and rotates the C/D case 3. The C/D unit 4 is positioned at the right-hand section in the C/D case 3, while the F/D unit 5 is positioned at the left-hand section in the C/D case 3.

The drive mechanism also includes a viscous coupling 7, which controls the differential operation of the C/D unit 4. A sleeve 6 connects the viscous coupling 7 to the C/D unit 4, thus transmitting power from the C/D unit 4 to the coupling 7. Fixed to the viscous coupling 7 is a T/F drive gear 8, which transmits the power of the sleeve 6 to a T/F driven gear 9. The T/F driven gear 9 is fitted over a T/F axle 9'. The T/F axle 9' is rotated by the T/F drive gear 8, thus transmitting the drive power of the F/D unit 5 to a rear differential (R/D) unit (not shown).

The C/D unit 4 is comprised of a plurality of C/D pinion gears 4a and two C/D side gears. The C/D pinion gears 4a are carried by the C/D case 3, while the two C/D side gears engage with and are rotated by the two C/D pinion gears 4a. In this case, the speed ratio between the two C/D side gears is variable in accordance with a rotating resistance acting on the front and rear wheels.

The two C/D side gears comprise right and left side gears 4b and 4c. The right C/D side gear 4b is connected to the sleeve 6. Meanwhile, the left C/D side gear 4c is connected to a middle shaft 4d, with an inner shaft 7a of the viscous coupling 7 being fitted over the middle shaft 4d.

The F/D unit 5 comprises an F/D case 5a, which is fixedly connected to the C/D left side gear 4c of the C/D unit 4, thus being rotatable along with the C/D left side gear 4c. The F/D case 5a also carries a plurality of F/D pinion gears 5b. The F/D unit 5 also includes two F/D side gears 5c, which engage with the F/D pinion gears 5b. The two F/D side gears 5c are thus rotated by the F/D pinion gears 5b at rotating speeds which may differ in accordance with a difference between the rotating resistances acting on two axles of the two F/D side gears 5c. That is, the speed ratio between the two F/D side gear 5c is variable. The F/D unit 5 further includes two front axles 5d, which are connected to and rotated by the two F/D side gears 5c.

In the operation of the above drive mechanism for 4WD-type automobiles, the drive power of an engine A is primarily transmitted to the transmission B, in which the rotating speed of the drive power is appropriately changed. The drive power, with a changed rotating speed, is, thereafter, appropriately distributed to four wheels of an automobile by the drive mechanism.

FIG. 5 is a block diagram showing the drive power transmission passage of the typical drive mechanism for distributing the drive power to the four wheels. As shown in the drawing, the drive power, with a changed rotating speed, is primarily transmitted to the ring gear 2 through the T/M gear 1, thus rotating the C/D case 3. Therefore, the C/D pinion gears 4a are rotated along with the C/D case 3 and rotate the two C/D side gears 4b and 4c.

In this case, the speed ratio between the two C/D side gears 4b and 4c is variable in accordance with the rotating resistances acting on the front and rear wheels (not shown). That is, when the rotating resistance acting on the two front wheels is different from that of the rear wheels, the C/D unit 4 performs a differential operation, with the C/D pinion gears 4a of the C/D unit 4 being rotated and revolved and making the two front wheels have a rotating speed, which is different from that of the rear wheels.

Since the F/D case 5a is integrated with the left side gear 4c of the C/D unit 4 as described above, the rotating force of the left side gear 4c is transmitted to the F/D case 5a, thus rotating the F/D case 5a along with the F/D pinion gears 5b. The two F/D side gears 5c are thus rotated by the F/D pinion gears 5b. The drive power in the form of the rotating force of the F/D side gears 5c is, thereafter, transmitted to the left and right front wheels through the two front axles 5d, thus rotating the two front wheels.

In such a case, when the rotating resistance acting on the left front wheel is different from that of the right front wheel, the F/D unit 5 performs a differential operation, in which the F/D pinion gears 5a are rotated and revolved and make the rotating speed of one front axle 5d for the left front wheel different from that of the other front axle 5d for the right front wheel.

The rotating force of the C/D right side gear 4b is transmitted to the sleeve 6, thus rotating the sleeve 6 along with the T/F drive gear 8. The T/F drive gear 8 rotates the T/F driven gear 9, thus allowing the drive power in the form of the rotating force of the T/F driven gear 9 to be transmitted to the R/D unit (not shown) through the T/F axle 9' or the center shaft of the T/F driven gear 9. The R/D unit appropriately distributes the drive power to the left and right rear wheels, thus rotating the two rear wheels.

During such an operation of the drive mechanism, the rotating force of the C/D left side gear 4c is transmitted to the middle shaft 4d, thus rotating the middle shaft 4d along with the inner shaft 7a of the viscous coupling 7. Meanwhile, the rotating force of the C/D right side gear 4b is transmitted to the sleeve 6, thus rotating the sleeve 6 along with the housing 7b of the viscous coupling 7. When the rotating speed of the front wheels is equal to that of the rear wheels, the inner and outer plates 7c and 7d of the viscous coupling 7 are rotated at the same rotating speed.

Meanwhile, when the rotating speed of the front wheels is different from that of the rear wheels, the inner and outer plates 7c and 7d of the viscous coupling 7 are rotated at different rotating speeds. However, the coupling 7 in the above state reduces the rotating speed difference between the two plates 7c and 7d using its viscosity, thus limiting the differential operation of the C/D unit 4.

However, such a typical drive mechanism for FF-4WD automobiles is problematic in that it is very difficult to install the transfer case C in an engine compartment since both the middle shaft 4d and the sleeve 6 of the drive mechanism causes an interference between the transfer case C and the cylinder block (not shown) of an engine during installation of the transfer case C.

SUMMARY OF THE INVENTION

Accordingly, the present invention has been made keeping in mind the above problems occurring in the prior art, and an object of the present invention is to provide a drive mechanism for 4WD automobiles, of which the middle shaft is positioned at a side of the transmission, thus allowing the transfer case to be easily installed in an engine compartment without causing any interference between the transfer case and the cylinder block of an engine.

In order to accomplish the above object, the present invention provides a drive mechanism for 4WD automobiles, comprising: a center differential unit comprised of an epicyclic gear train and adapted for distributing the drive power of an engine to front and rear wheels of an automobile; a differential drive gear selectively rotated by a transmission gear, thus driving the center differential unit; a front differential unit comprised of a bevel gear train and adapted for transmitting the drive power from the center differential unit to the front wheels; a viscous coupling connected to the center differential unit and adapted for limiting a differential operation of the center differential unit; a middle shaft selectively rotated by a ring gear of the center differential unit; and a spiral bevel gear formed on the middle shaft and adapted for transmitting the drive power to the rear wheels through a transfer axle.

BRIEF DESCRIPTION OF THE DRAWINGS

The above and other objects, features and other advantages of the present invention will be more clearly understood from the following detailed description taken in conjunction with the accompanying drawings, in which:

FIGS. 1a and 1b are views of a drive mechanism for 4WD automobiles in accordance with the preferred embodiment of the present invention, in which:

FIG. 1a is a view showing the position of a transfer case in the drive mechanism; and FIG. 1b is a schematic view showing the construction of the drive mechanism;

FIGS. 4a and 4b are views of the typical drive mechanism, in which:

FIG. 4a is a view showing the position of a transfer case in the drive mechanism; and FIG. 4b is a schematic view showing the construction of the drive mechanism.

DESCRIPTION OF THE PREFERRED EMBODIMENTS

Figure 1A:
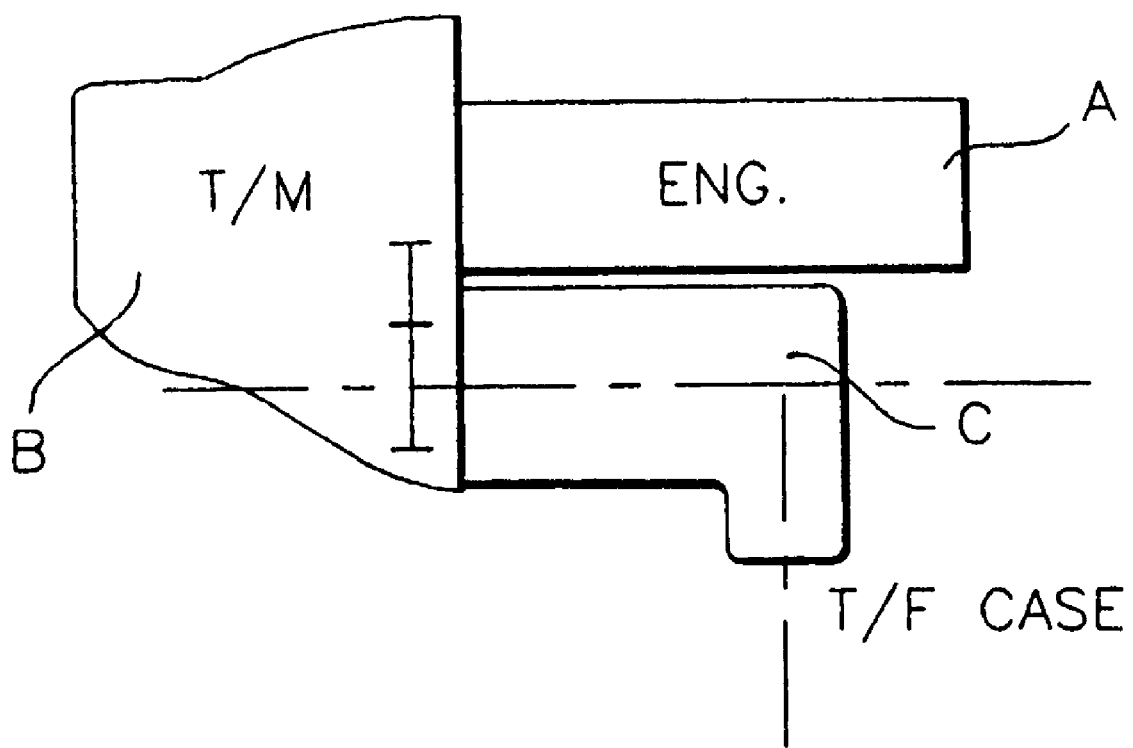
Figure 1B:
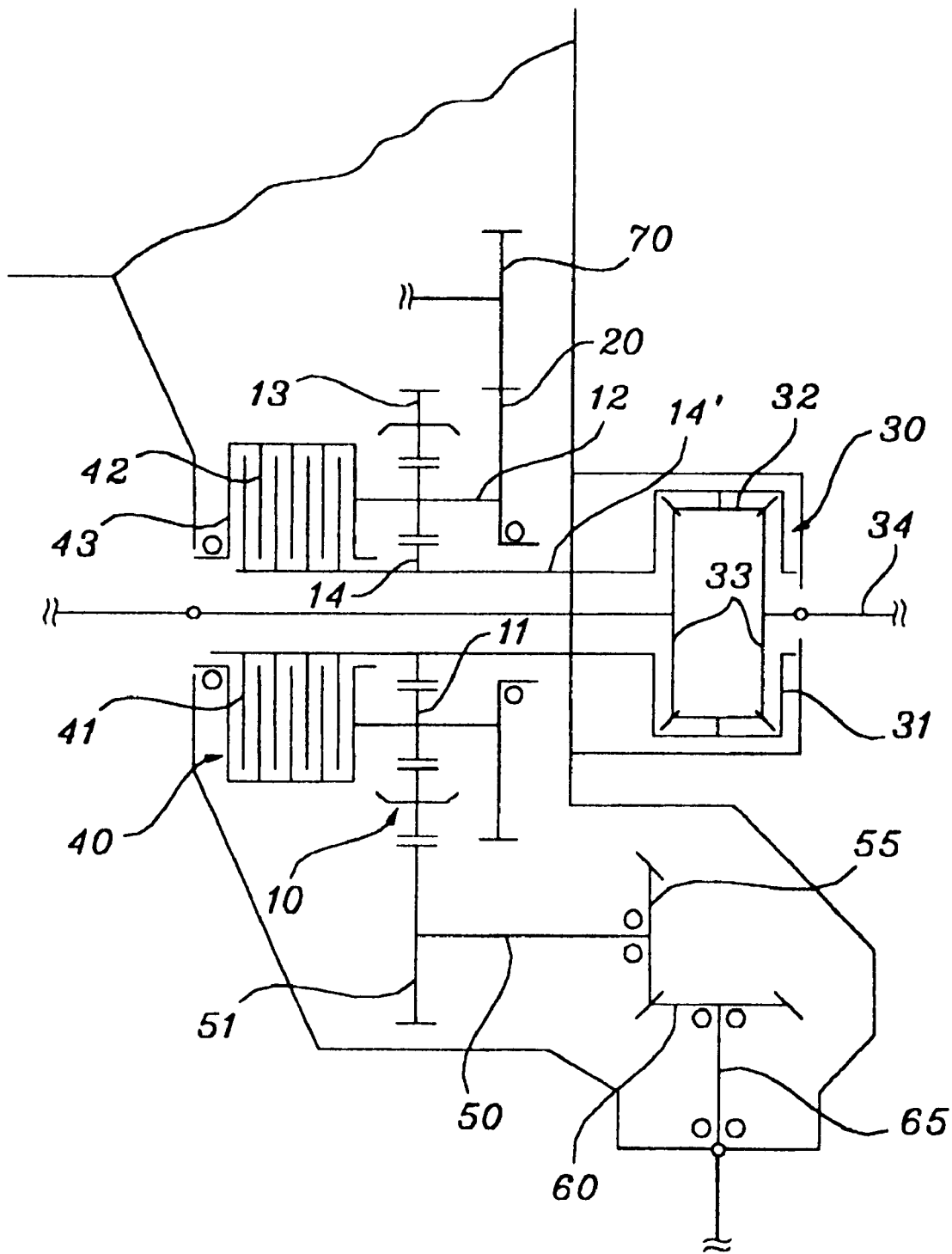

FIGS. 1a and 1b show a drive mechanism for 4WD automobiles in accordance with the preferred embodiment of the present invention. As shown in the drawings, the drive mechanism of this invention, which is received in a transfer case, comprises a center differential (C/D) unit 10, a differential drive (D/D) gear 20 and a front differential (F/D) unit 30. The C/D unit 10 is an epicyclic gear train and distributes the drive power of an engine to the front and rear wheels of a 4WD automobile. The D/D gear 20 is rotated by a transmission (T/M) gear, thus driving the C/D unit 10. The F/D unit 30 is a bevel gear train and transmits the drive power from the C/D unit 10 to the two front wheels, thus rotating the front wheels. The drive mechanism also includes a middle shaft 50, which engages with a ring gear 13 of the C/D unit 10. A planetary gear carrier 12 is positioned at a side of the C/D unit 10 and is rotated by the D/D gear 20. A viscous coupling 40 is connected to the gear carrier 12 and limits the differential operation of the C/D unit 10.

A middle shaft gear 51 is formed on one end of the middle shaft 50 and engages with the ring gear 13 of the C/D unit 10, while a spiral bevel gear 55 is formed on the other end of the middle shaft 50. The spiral bevel gear 55 engages with a transfer (T/F) driven gear 60. A T/F axle 65 is connected to the T/F driven gear 60 and transmits the drive power in the form of the rotating force of the T/F driven gear 60 to the two rear wheels.

The C/D unit 10 comprises a plurality of planetary gears 11, which are carried by the planetary gear carrier 12. The planetary gears 11 commonly and interiorly engage with the ring gear 13, thus allowing the ring gear 13 to be rotatable. A sun gear 14 engages with the planetary gears 11 at the center of the ring gear 13, thus being rotatable by the planetary gears 11.

The F/D unit 30 is comprised of an F/D case 31, which is inserted into the sun gear 14 of the C/D unit 10. A plurality of F/D pinion gears 32 are carried by the F/D case 31, thus being rotatable along with the F/D case 31. The F/D unit 30 also includes two F/D side gears 33, which engage with the F/D pinion gears 32. The two F/D side gears 33 are thus rotated by the pinion gear 32 at rotating speeds, which may differ in accordance with a difference between the rotating resistances acting on two front axles of the two side gears 33. Two front axles 34 are connected to the two F/D side gears 33 respectively, thus transmitting the drive power in the form of the rotating force of the two F/D side gears 33 to the two front wheels.

The inner plate 41 of the viscous coupling 40 is formed on the shaft 14' of the sun gear 14, while the housing 43 of the coupling 40 is held by the planetary gear carrier 12. The outer plate 42 is formed on the above coupling housing 43.

The operational effect of the above drive mechanism will be described hereinbelow.

In the operation of the drive mechanism, the drive power of an engine A is transmitted to the transmission B, which changes the rotating speed of the drive power prior to outputting the drive power from the transmission gear 70. The transmission gear 70, which is formed on the output shaft of the transmission B, is thus rotated along with the D/D gear 20. Since the D/D gear 20 is integrated with the planetary gear carrier 12 of the C/D unit 10, the D/D gear 20 is rotated along with the gear carrier 12.

When the gear carrier 12 is rotated as described above, the F/D unit 30 is rotated by the sun gear 14. In addition, the middle shaft gear 51, which exteriorly engages with the ring gear 13, is rotated by the ring gear 13. When the F/D unit 30 is rotated as described above, the two front wheels of an automobile are rotated by the drive power. In such a case, the F/D unit 30 selectively performs a differential operation in accordance with the rotating resistances acting on the two front wheels.

On the other hand, both the middle shaft 50 and the spiral bevel gear 55 are rotated by the middle shaft gear 51, thus rotating the T/F driven gear 60 and transmitting the drive power to the two rear wheels through the T/F axle 65.

In the operation of the drive mechanism, the viscous coupling 40 removes any difference between the rotating speeds of the front and rear wheels using the silicon oil filled in the coupling housing 43.

Figure 2:
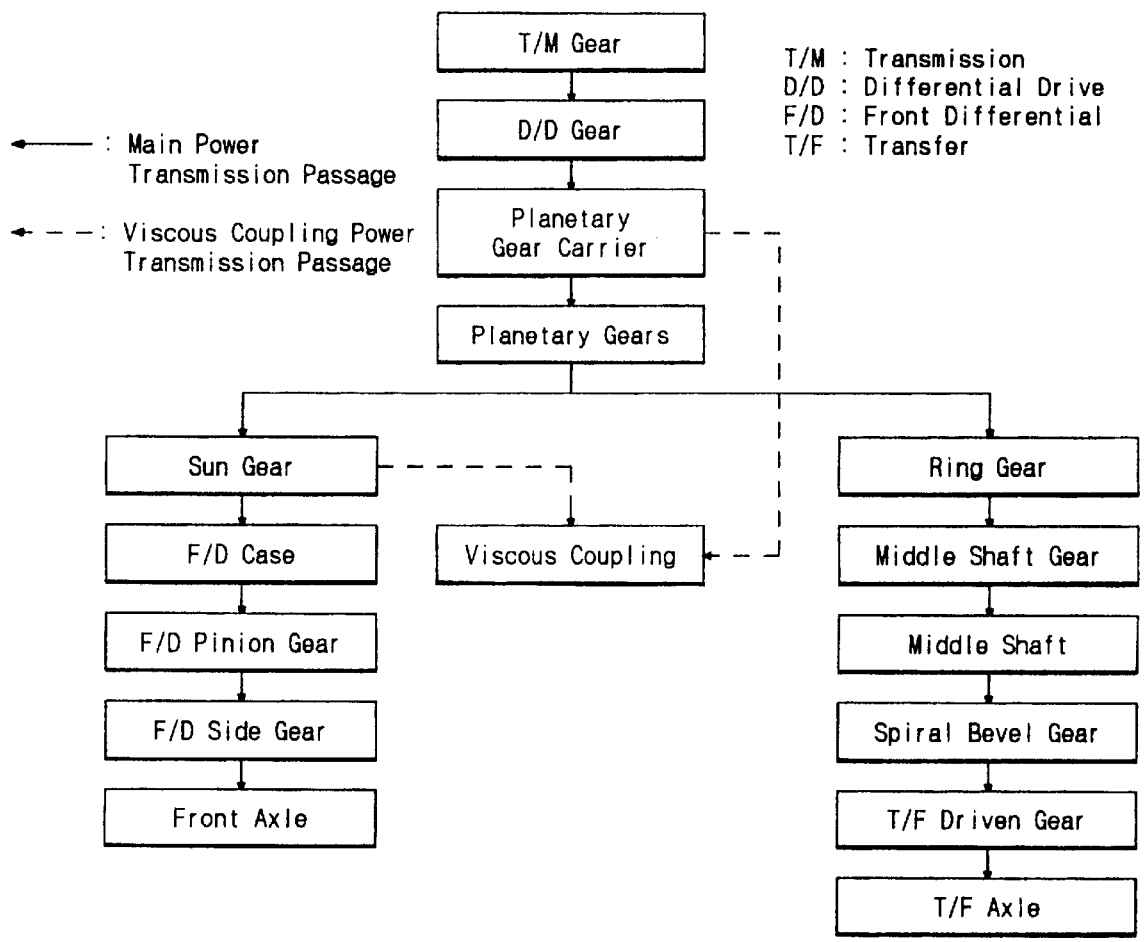
FIG. 2 is a block diagram showing the drive power transmission passage of the drive mechanism according to this invention.
Figure 3:
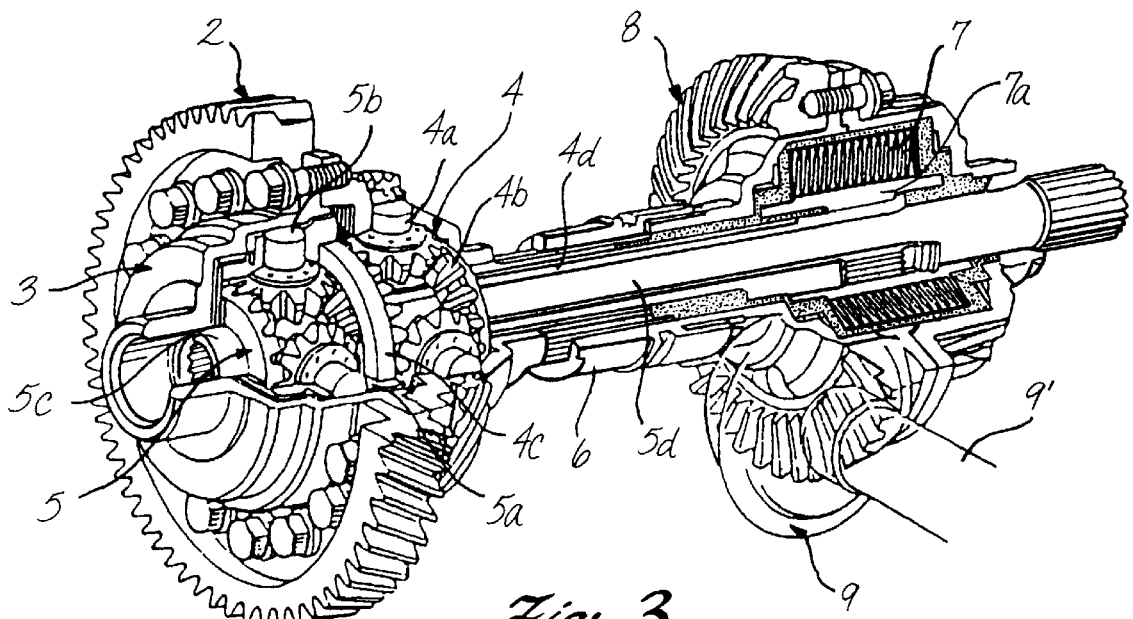
FIG. 3 is a partially broken perspective view showing the construction of a typical drive mechanism for 4WD automobiles.
Figure 4A:
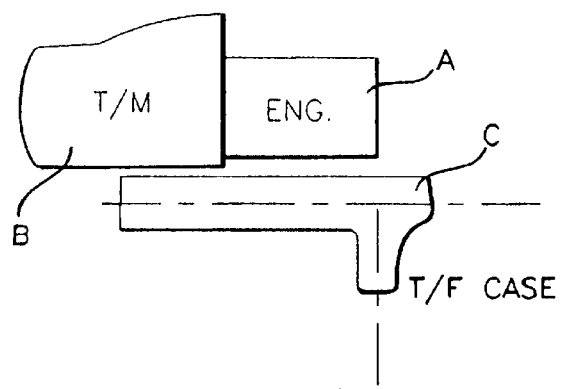
Figure 4B:
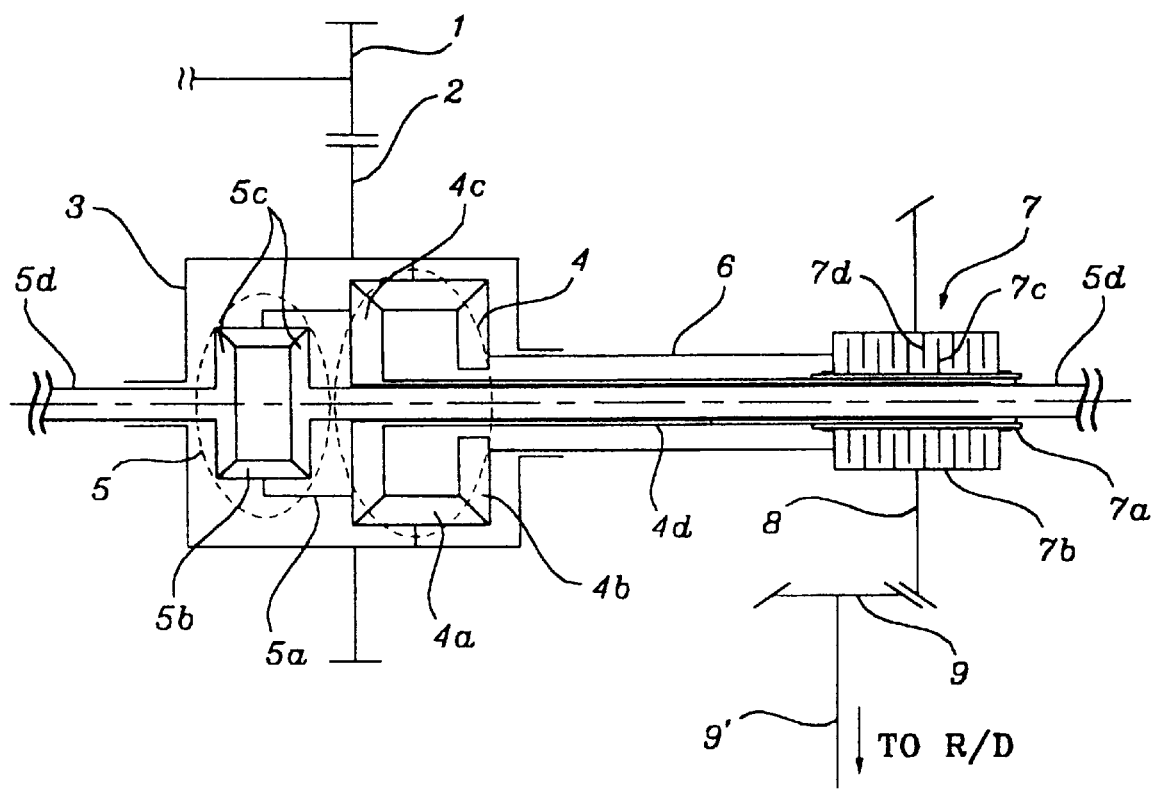
Figure 5:
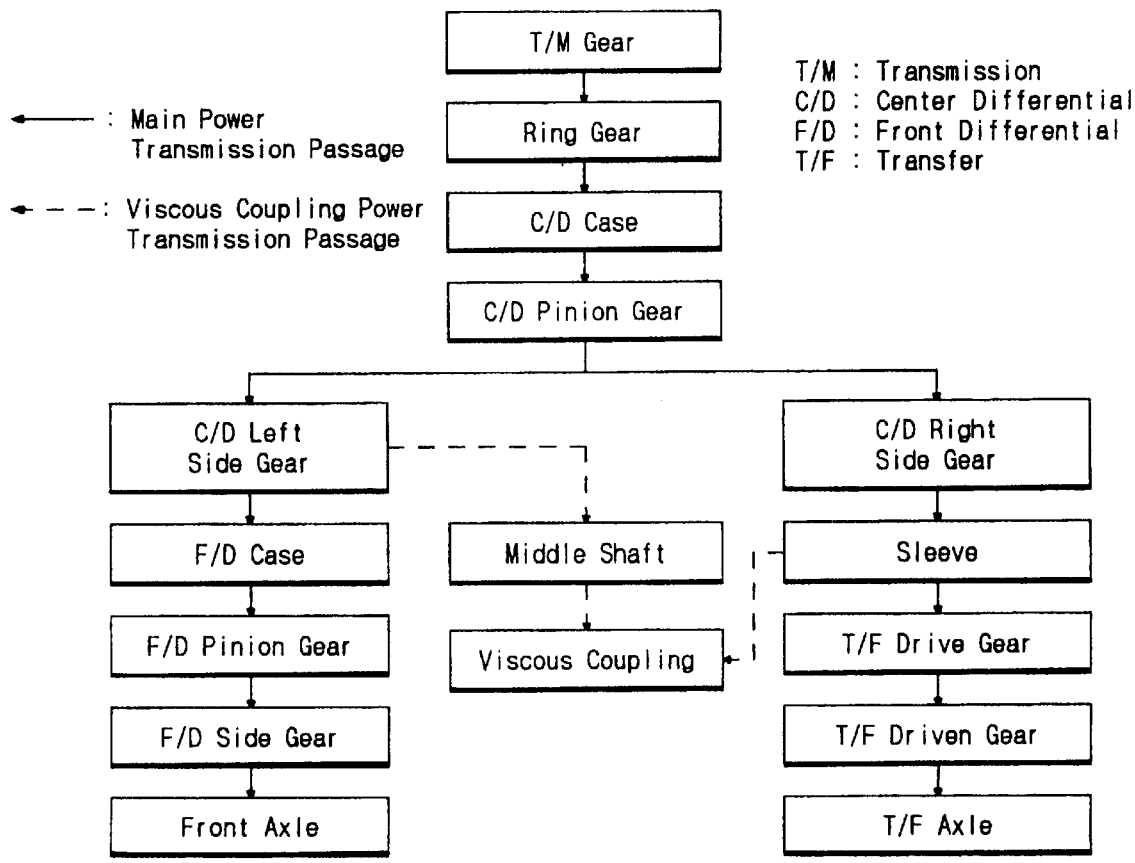
FIG. 5 is a block diagram showing the drive power transmission passage of the typical drive mechanism.

FIG. 2 is a block diagram showing the drive power transmission passage of the drive mechanism according to this invention. As shown in the drawing, the drive power, with a changed rotating speed, is primarily transmitted to the D/D gear 20 through the TIM gear 70, thus rotating the D/D case 20 along with the planetary gear carrier 12 of the C/D unit 10. Therefore, the drive power is transmitted to both the ring gear 13 and the sun gear 14 through the planetary gear carrier 12.

Since the F/D case 31 is integrated with the sun gear 14 of the C/D unit 10 as described above, the rotating force of the sun gear 14 is transmitted to the F/D case 31, thus rotating the F/D case 31 along with the F/D pinion gears 32. The two F/D side gears 33 are thus rotated by the F/D pinion gears 32. The drive power in the form of the rotating force of the F/D side gears 33 is thus transmitted to the left and right front wheels through the two front axles 34 and rotates the two front wheels. In such a case, when the rotating resistance acting on the left front wheel is different from that of the right front wheel, the F/D unit 30 performs a differential operation, in which the F/D pinion gears 32 are rotated and revolved and make the rotating speed of one front axle 34 for the left front wheel different from that of the other front axle 34 for the right front wheel.

Additionally, the ring gear 13 rotates the middle shaft 50. Therefore, the middle shaft 50 transmits the drive power to the T/F driven gear 60 through the spiral bevel gear 55, thus transmitting the drive power to the two rear wheels through the T/F axle 65.

As described above, the present invention provides a drive mechanism for 4WD automobiles. In the drive mechanism, the C/D unit is comprised of an epicyclic gear train, thus allowing the FF (Front Engine Front Drive)-middle shaft to be positioned at a side of the transmission and allowing the transfer case, with the drive mechanism, to be spaced apart from the cylinder block of an engine at an interval. Therefore, it is possible to easily install the transfer case in an engine compartment without causing any interference between the transfer case and the cylinder block of the engine.

In addition, the C/D unit is directly connected to the viscous coupling, thus achieving the recent trend of compactness and slimness of the drive mechanism and allowing for a more flexible layout of the engine compartment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A drive mechanism for four wheel drive automobiles, comprising:

a center differential unit comprised of an epicyclic gear train for distributing the drive power of an engine to front and rear wheels of an automobile;

a differential drive gear selectively rotated by a transmission gear, thus driving said center differential unit;

a front differential unit comprised of a bevel gear train for transmitting the drive power from said center differential unit to the front wheels;

a viscous coupling connected to said center differential unit for limiting a differential operation of said center differential unit;

a middle shaft selectively rotated by a ring gear of said center differential unit; and a spiral bevel gear formed on said middle shaft for transmitting the drive power to the rear wheels through a transfer axle;

wherein said viscous coupling comprises:

a coupling housing having an outer plate, said coupling housing being fixedly connected to a planetary gear carrier of said center differential unit, with the planetary gear carrier being rotatable by said differential drive gear; and an inner plate fixedly connected to a sun gear shaft of said center differential unit, said inner plate cooperating with said outer plate, thus limiting a difference between the rotating speeds of the front and rear wheels.

* * * * *